United States Patent [19]
Chang

[11] Patent Number: 5,732,928
[45] Date of Patent: Mar. 31, 1998

[54] COMPUTER KEYBOARD STAND

[75] Inventor: Joe Chang, Taipei, Taiwan

[73] Assignee: Behavior Tech Computer Corporation, Taipei, Taiwan

[21] Appl. No.: 621,691

[22] Filed: Mar. 26, 1996

[51] Int. Cl.$^6$ .................................................. F16F 15/00
[52] U.S. Cl. ...................... 248/688; 248/676; 248/685; 248/918; 248/456; 400/681; 400/682
[58] Field of Search .......................... 248/456, 188.2, 248/688, 685, 676, 918, 146, 921, 922; 108/1; 400/692, 682, 691, 693

[56]  References Cited

U.S. PATENT DOCUMENTS

| 4,527,149 | 7/1985 | Swensen | 400/682 X |
| 4,856,748 | 8/1989 | Obermyer | 248/688 |
| 5,337,985 | 8/1994 | Hale | 248/676 X |
| 5,347,424 | 9/1994 | Akahane | 248/688 X |
| 5,375,800 | 12/1994 | Wilcox et al. | 248/918 X |
| 5,503,361 | 4/1996 | Kan-O et al. | 248/688 |

Primary Examiner—Leslie A. Braun
Assistant Examiner—Long Dinh Phan
Attorney, Agent, or Firm—Jones, Day, Reavis & Pogue

[57]  ABSTRACT

A computer keyboard stand includes a base and a support. The base is coupled to a bottom of a computer keyboard by a screw. The base has two side walls each having a plurality of apertures laterally defined in a greater portion of its length from a first end of an inner face thereof and a bore defined adjacent to a second end of the inner face. The support includes a first wing and a second wing hinged to the first wing. The first wing has a pair of arms laterally extending out from opposite sides of a free end thereof to pivotally extend into the bores of the base. The second wing has a pair of limbs laterally protruding out from a free end thereof to retainably engage with one pair of the plurality of apertures. The computer keyboard stand provide an incremental, multi-level angle adjusting function to the computer keyboard.

6 Claims, 3 Drawing Sheets

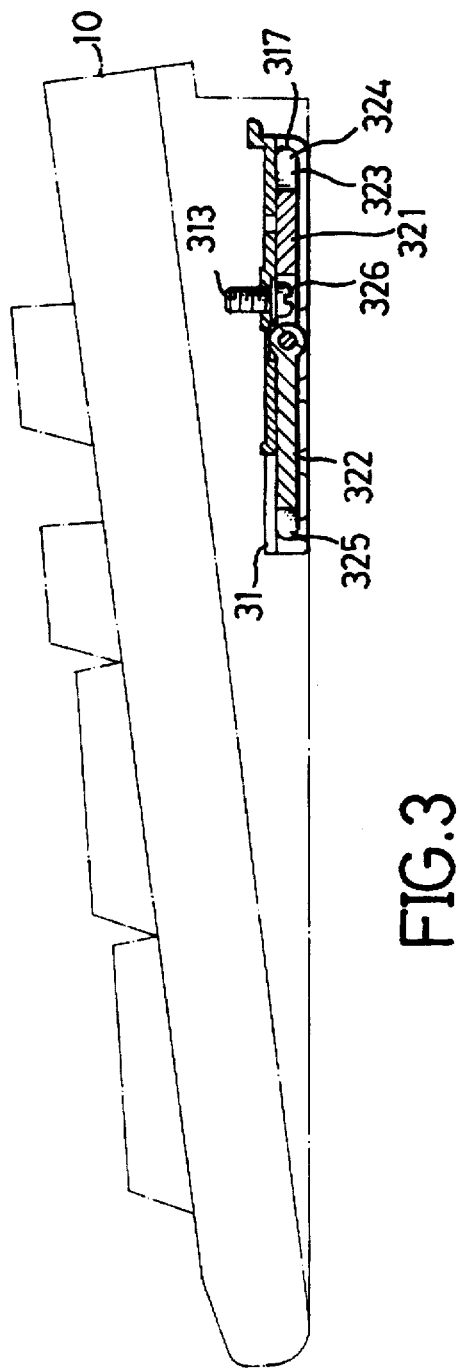
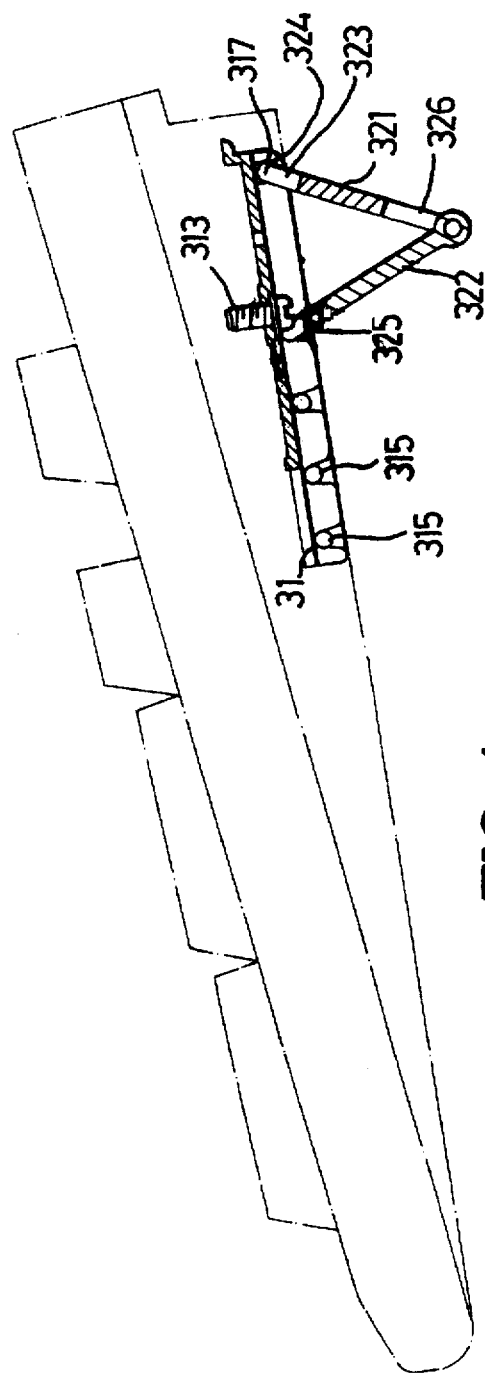
FIG. 3
FIG. 4

COMPUTER KEYBOARD STAND

BACKGROUND OF THE INVENTION

1. Field of the Invention

The present invention generally relates to a computer keyboard and, more particularly, to an improved computer keyboard stand having a multi-level adjusting capability.

2. Description of Related Art

A conventional computer keyboard 10, as shown in FIG. 1, normally comprises two arms 20 each pivotally coupled to a bottom thereof at positions away from a user end and spaced apart along a longitudinal direction thereof. Each of the arms 20 can be either extracted within the computer keyboard 10 to provide it a gentle elevation angle or be extended to provide it a greater elevation angle. Since the conventional computer key board 10 can only provide two extreme options in selecting the operation angles and can not be adjusted gradually according to personal typing custom, it is not only far from satisfying an individual customer's needs but also a main cause of wrist problems experienced by computer operators.

Therefore, there has been a long and unfulfilled need for a computer keyboard which has a stand having a multi-level angle adjusting function to make the computer keyboard more user friendly.

SUMMARY OF THE INVENTION

One object of the present invention is to provide a computer keyboard stand which has a multi-level angle adjusting function to incrementally adjust an operation angle of the computer keyboard.

To achieve the above object, the present invention provides a computer keyboard stand which includes a base having a floor and a pair of side walls formed at opposite sides of the floor, each of the side walls having a plurality of apertures defined in a greater portion of its length from a first end of an inner face thereof and a bore defined adjacent to a second end of the inner face; a coupling means for coupling the base to a bottom of a computer keyboard; and a support comprising a first wing and a second wing hinged to the first wing, the first wing having a pair of arms laterally extending out from opposite sides of a free end thereof to pivotally connect with the bores of the base and the second wing having a pair of limbs laterally protruding out from a free end thereof to selectively engage with one pair of the plurality of apertures.

In accordance with one aspect of the present invention, each of the plurality of apertures has a notch defined in a periphery defining the aperture to facilitate the engagement with the limbs of the second wing.

In accordance with another aspect of the present invention, the floor of the base has a hole defined therein and the first wing has a cut-out defined therein at a position corresponding to the hole of the base.

Other objects, advantages, and novel features of the invention will become more apparent from the following detailed description when taken in conjunction with the accompanying drawings.

BRIEF DESCRIPTION OF THE DRAWINGS

FIG. 3 is a cross-sectional view of the computer keyboard stand according to the present invention assembled to a bottom of a computer keyboard; and FIG. 4 is a cross-sectional view of the computer keyboard stand shown in FIG. 3 illustrating two supporting wings thereof folded to adjust an elevation angle of the computer keyboard.

DETAILED DESCRIPTION OF THE PREFERRED EMBODIMENTS

Figure 1:
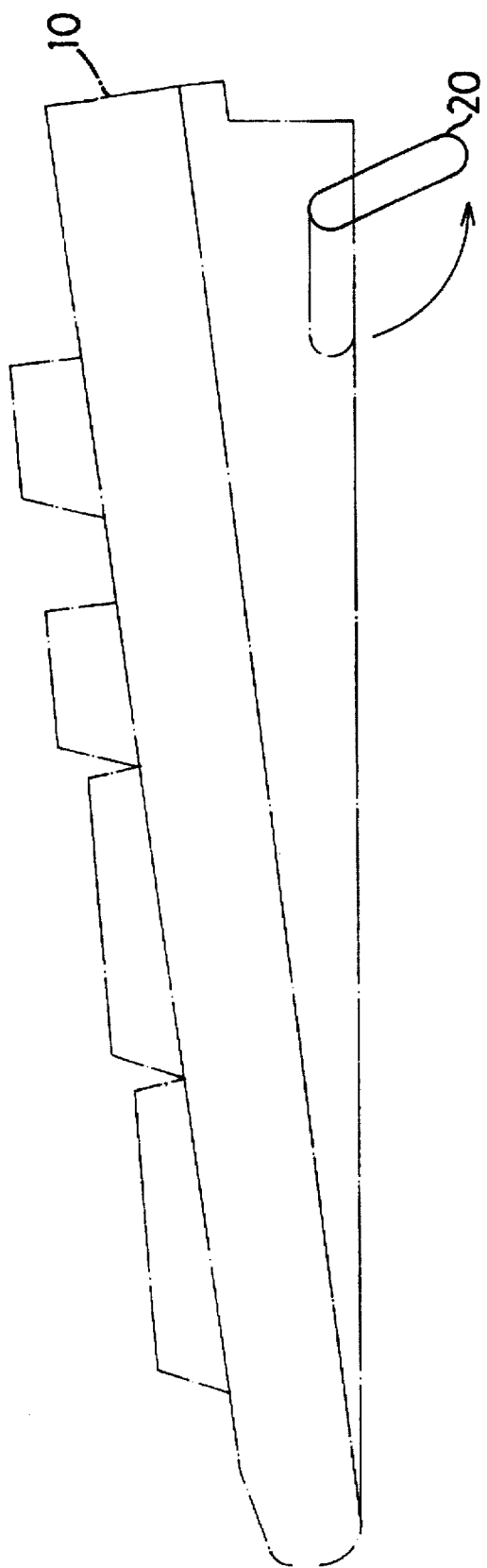
FIG. 1 is a side elevation view schematically illustrating a conventional computer keyboard.
Figure 2:
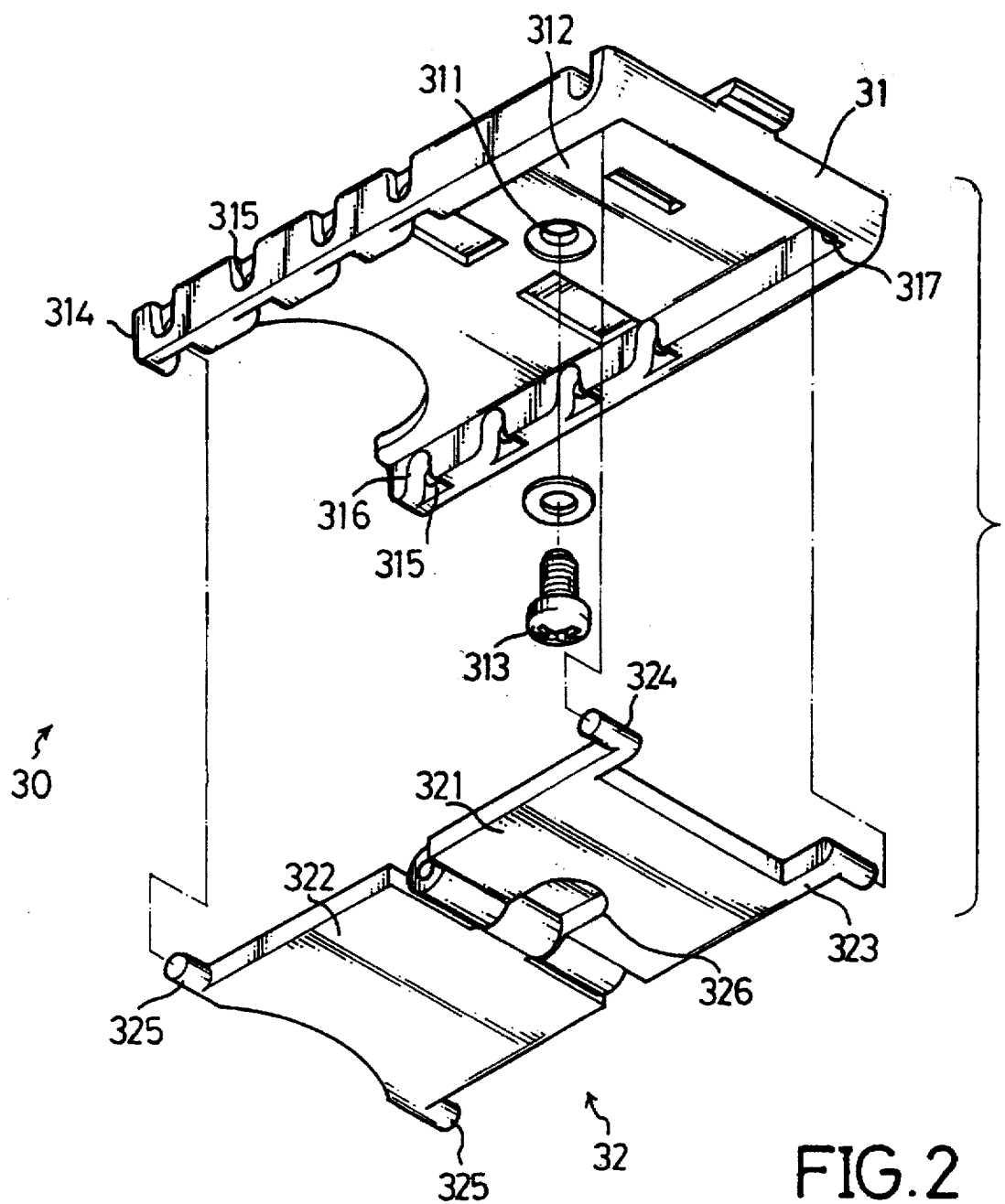
FIG. 2 is an exploded perspective view illustrating a computer keyboard stand according to the present invention

Referring to the drawings and initially to FIG. 2, a computer keyboard stand 30 in accordance with the present invention generally includes a base 31 and a support 32. The base 31 has a through hole 311 defined in a floor 312 thereof and a fastening element, preferably a screw 313, extending through the hole 311 for fastening the base 31 to a bottom of a computer keyboard 10 (not shown in this figure). Further, the base 31 has two walls 314 disposed at two opposite sides thereof and each of the two walls 314 has a plurality of apertures 315 laterally defined in a greater portion of its length from a first end of an inner face thereof. Moreover, a bore 317 is defined adjacent to a second end of the inner face of each of the side walls 314. Preferably, each of the plurality of apertures 315 has a guiding notch 316 defined in a periphery defining the aperture 315.

The support 32 comprises a first wing 321 and a second wing 322 which are hinged together. The first wing 321 has two legs 323 integrally extending from respective sides of a free end thereof and each of the legs 323 has an arm 324 integrally and laterally extending out from a free end thereof. Preferably, a distance between the arms 324 is slightly greater than a distance between the side walls of the base 31 and the legs 323 can be resiliently compressed toward each other. The second wing 322 has two limbs 325 each laterally extending out from a free end of one side thereof respectively.

In assembly, the base 31 is firstly attached to a bottom of the computer keyboard 10 by extending the screw 313 through the hole 311 and then the support 32 is attached to the base 31 by pivotally retaining the arms 324 of the first wing 321 within the corresponding bores 317 of the base 31 and detachably receiving the limbs 325 within a pair of outermost apertures 315 of the base 31, as illustrated in FIG. 3. Alternatively, the first wing 321 may have a cut-out 326 defined therein at a position corresponding to the through hole 311 of the base 31 which is sized to allow the screw 313 to pass therethrough such that the support 32 may firstly be assembled to the base 31 and then a complete set of stand 30 is attached by the screw 313 to the bottom of the computer keyboard 10.

In use, when the first and the second wings 321, 322 are in the same plane, i.e., an angle therebetween is 180°, the support 32 is completely received within the base 31 and the bottom of the computer keyboard 10 is in a horizontal position, as shown in FIG. 3. When a greater keyboard operation angle is desired, the second wing 322 of the support 32 may be folded toward the first wing 321 by selectively disengaging/engaging the limbs 325 thereof with the apertures 315 along a longitudinal axis of the base 31 to incrementally adjust an angle between the horizontal plane and the bottom of the keyboard 10, as shown in FIG. 4. That is, the closer the first and the second wings 321 and 322 become, the greater is the angle between the horizontal plane and the bottom of the keyboard 10.

Although the invention has been explained in relation to its preferred embodiment, it is to be understood that many other possible modifications and variations can be made without departing from the spirit and scope of the invention as hereinafter claimed.

I claim:

1. A computer keyboard stand comprising:

a base having a floor and a pair of side walls formed at opposite sides of the floor, each of the side walls having a plurality of apertures defined along a greater portion of its length from a first end of an inner face thereof and a bore defined adjacent to a second end of the inner face;

a coupling means for coupling the base to a bottom of a computer keyboard; and a support comprising a first wing and a second wing hinged to the first wing, the first wing having a pair of arms laterally extending out from opposite sides of a free end thereof pivotally extending into the bores of the base and the second wing having a pair of limbs laterally protruding out from a free end thereof retainably engaging with one pair of the plurality of apertures.

2. The computer keyboard stand as claimed in claim 1 wherein each of the plurality of apertures has a notch defined in a periphery defining the aperture to facilitate the engagement with the limbs of the second wing.

3. The computer keyboard stand as claimed in claim 1 wherein the floor of the base has a hole defined therein and the first wing has a cut-out defined therein at a position corresponding to hole of the base.

4. The computer keyboard stand as claimed in claim 1 wherein the coupling means is a screw.

5. The computer keyboard stand of claim 2 including at least one computer keyboard secured thereto.

6. The computer keyboard stand of claim 2 including at least one computer keyboard secured thereto.

* * * * *